United States Patent [19]
Minow et al.

[11] Patent Number: 6,021,462
[45] Date of Patent: Feb. 1, 2000

[54] METHODS AND APPARATUS FOR SYSTEM MEMORY EFFICIENT DISK ACCESS TO A RAID SYSTEM USING STRIPE CONTROL INFORMATION

[75] Inventors: Martin A. Minow, San Francisco; John W. Brisbin, San Jose, both of Calif.

[73] Assignee: Apple Computer, Inc., Cupertino, Calif.

[21] Appl. No.: 08/921,401

[22] Filed: Aug. 29, 1997

[51] Int. Cl.[7] .............................. G06F 11/00; G06F 13/00
[52] U.S. Cl. .......................... 711/114; 711/111; 711/112
[58] Field of Search ................................... 711/112, 113, 711/114, 161, 162, 154, 111

[56] References Cited

U.S. PATENT DOCUMENTS

| | | | |
|---|---|---|---|
| 5,390,187 | 2/1995 | Stallmo | 711/114 |
| 5,497,476 | 3/1996 | Oldfield et al. | 711/112 |
| 5,537,534 | 7/1996 | Voigt et al. | 711/114 |
| 5,542,053 | 7/1996 | Bland et al. | 710/129 |
| 5,742,752 | 4/1998 | DeKoning | 711/114 |
| 5,761,526 | 6/1998 | Sakakura et al. | 710/1 |
| 5,778,426 | 7/1998 | DeKoning et al. | 711/122 |
| 5,860,090 | 1/1999 | Clark | 711/113 |
| 5,875,457 | 2/1999 | Shalit | 711/114 |

OTHER PUBLICATIONS

IEEE, "Proceedings—The 13th International Conference on Distributed Computing Systems", IEEE Computer Society Technical Committee on Distributed Processing, Pittsburgh, Pennsylvania, May 25–28, 1993.

Anderson, Michael H., "Strength (And Safety) In Numbers", BYTE, Dec. 1990.

Buzen and Shum, "RAID, CAID and Virtual Disks: I/O Performance at the Crossroads", 19th International Conference for the Management and Performance Evaluation of Enterprise Computing Systems, San Diego, CA. Dec. 5–10, 1993.

Peterson, Donald, C. "Redundant Disk Arrays Enhance Data Safety to Support Network Servers", Computer Technology Review, Winter 1990.

Chen et al. "RAID: High–Performance, Reliable Secondary Storage" ACM Computing Surveys, vol. 26, No. 2, Jun. 1994.

Primary Examiner—Tuan V. Thai
Attorney, Agent, or Firm—Beyer & Weaver, LLP

[57] ABSTRACT

A technique for accessing a series of secondary storage devices where a reduced amount of main memory is needed to implement the data transfer is disclosed. The technique operates to share control information stored in the main memory so that most of the main memory allocated to implementing a data transfer is shared by the series of the secondary storage drives.

30 Claims, 6 Drawing Sheets

METHODS AND APPARATUS FOR SYSTEM MEMORY EFFICIENT DISK ACCESS TO A RAID SYSTEM USING STRIPE CONTROL INFORMATION

BACKGROUND OF THE INVENTION

1. Field of the Invention

The present invention relates to computer systems, and more particularly, to accessing data that is distributed across multiple data storage devices.

2. Description of the Related Art

Computers systems typically include a processor, main memory and secondary storage memory. The processor is, for example, a Central Processing Unit (CPU) or a microprocessor. The main memory is normally Random Access Memory (RAM), and the secondary storage is typically a hard disk drive.

When the processor wants to make use of data stored in the secondary storage memory, the data is moved from the hard disk drive into the main memory. Normally, the data would be moved from the hard disk drive into the main memory in units of blocks. Because the transferring of blocks of data in this manner to and from the hard disk drive and the main memory is time consuming, computer systems have used a Direct Memory Access (DMA) controller to oversee the transferring of data. Typically, the DMA controller receives information from the processor indicating a base address from where bytes are to be moved, an address to where these bytes should be placed, and the number of bytes to be moved. The DMA controller is then able to monitor and oversee the transferring of the data, thus freeing the processor to perform other processing tasks.

To further improve performance of data transfers between the main memory and the secondary storage memory, scatter-gather units have been provided to assist in the programming of the DMA controller. In a "scatter" operation, the DMA controller is programmed to transfer data from the secondary storage memory to the main memory so that data being read is scattered into the main memory. The scattering of the data in the main memory means that the data is written to the main memory in a non-contiguous manner. In a "gather" operation, the DMA controller is programmed to transfer data from the main memory to the secondary storage memory. The gathering of the data refers to the obtaining of different non-contiguous segments of data from the main memory and then writing them to the secondary storage memory in a contiguous manner.

A scatter-gather unit essentially fetches descriptors from a scatter-gather list and programs these descriptors into the DMA controller. The descriptors include a physical address and a transfer count. The physical address indicates the address where the data is to be sent to or retrieved from, and the transfer count indicates a length or block of data to be transferred. In operation, therefore, the DMA controller will be programmed in accordance with a scatter-gather list stored in memory, which requires much less time than would otherwise be required to write to the program over a slow input/output (I/O) port of the processor. The processor then sends an instruction to the DMA controller to instruct it to prepare to perform a data transfer and an instruction to the scatter-gather unit to begin the transfer. The processor has then completed its responsibilities, and the scatter-gather unit retrieves the descriptor information from the scatter-gather list stored in memory and programs the DMA controller with the information. The DMA controller is then activated and operates to carry out the data transfer.

Computer systems typically use DMA controllers and scatter-gather lists with a virtual memory system. In a virtual memory system, the user's or application's virtual address space is larger than the actual amount of physical memory (i.e., main memory) available. In such cases, a memory manager is responsible for managing the memory so that the virtual address space is properly converted to physical address space and vice versa. In doing so, the memory manager often "swaps" blocks of data between the main memory and the secondary storage memory. As previously noted, the task of overseeing the data transfer can be largely delegated to a DMA controller so that the processor need only initiate the transfer. The scatter-gather lists come into play because DMA controllers generally assume that the memory is contiguous. However, in a virtual memory system, the main memory holds discontiguous blocks (pages) of memory. As such, the scatter-gather lists are used with the DMA controller so that the DMA controller works properly in a virtual memory environment. Accordingly, scatter-gather lists facilitate the transfer of blocks of data to and from main memory when the blocks are physically discontiguous in the main memory. A gather-write operation writes physically discontiguous segments of data to a contiguous range of sectors in the secondary storage memory. A scatter-read operation reads a contiguous range of sectors from the secondary storage memory to physically discontiguous areas of the main memory. Accordingly, in a virtual memory system having a DMA controller that supports scatter-gather lists, the DMA controller is able to transfer requested data directly from the secondary storage memory and to the main memory or vice versa, with the scatter-gather list being used to determine the physical address in the main memory where the data is to be placed or retrieved from.

Moreover, some computer systems use a series of secondary storage devices to store data. The series of secondary storage devices provide redundancy and/or improved performance. The series secondary storage devices are often referred to as a Redundant Array of Inexpensive Disks (RAID). With a RAID design, the data is striped across the series of secondary storage devices. Consequently, a data transfer request requires the retrieval of data from multiple of the secondary storage devices. In such cases, separate device specific scatter-gather lists (or stripe disk requests) are formed for each secondary storage device, with each device specific scatter-gather list identifying the physical addresses and lengths of each block or groups of blocks to be transferred from the particular secondary storage device to satisfy the data transfer request. Additional background information on RAID designs can be found in Gibson, "Redundant Disk Arrays: Reliable, Parallel Secondary Storage," The MIT Press (ISBN 0-262-07142-8), 1992.

FIG. 1 is a flow diagram of scatter-gather accessing 100 of disk drives according to a conventional approach. The conventional scatter-gather accessing 100 is performed by a computer system having a processor, a DMA controller, a main memory, and a RAID system (or RAID memory subsystem) including a plurality of disk drives. The computer system also provides a virtual memory subsystem and includes a memory controller to manage the virtual memory subsystem.

The conventional scatter-gathering accessing 100 initially receives 102 a data transfer request. Typically, the data transfer request will indicate a virtual (or logical) address of the data to be transferred as well as a length of the data to be transferred. Next, the virtual address provided with the data transfer request is translated 104 from a virtual address to a physical address. Because the computer system uses virtual memory, the resulting physical addresses generally refer to discontiguous areas of the physical memory. Then, memory is allocated 106 for a scatter-gather list. The allocation of the memory is performed by the virtual memory subsystem of the computer system. After the memory has been allocated, the scatter-gather list is constructed 108. The length of the scatter-gather list depends on the quantity of data to be transferred from the disk drives.

Next, memory is allocated 110 for stripe disk requests. After allocating the memory, the conventional scatter-gather accessing 100 forms 112 stripe disk requests for the disks. Namely, for each of the disk drives of the RAID system, a separate stripe disk request is formed and stored in the allocated memory. A stripe disk request for each disk drive would include a block number on the disk drive, a physical starting address, and a length of data to transfer. Hence, the stripe disk request specifies the particular blocks or groups of blocks on the associated disk drive to be accessed and thus takes into consideration that the data is striped across the disk drives. The length of the stripe disk requests for each of the disk drives depends on the quantity of data to be transferred from each of the disk drives. In effect, the stripe disk requests are the result of scatter-gather of the scatter-gather list due to the striping of data across the disk drives by the RAID system. The stripe disk requests can also be considered scatter-gather lists, though the scatter-gather is actually over two levels, once for the virtual to physical conversion and another for the RAID striping.

Then, using the associated stripe disk request, the disk drives are accessed 114 in accordance with the respective stripe disk request. After all the data requested from each of the disk drives has been retrieved by the accessing 114, the main memory that was previously allocated for the scatter-gather list as well as the striped disk requests is de-allocated 116. Following block 116, the conventional scatter-gather accessing 100 is complete and ends.

One problem with computer systems having a RAID system is that the scatter-gather lists become longer and more complicated, as the amount of data transfer increases. As a result, in order to store the scatter-gather lists in the main memory for large data transfers, a large amount of main memory has to be allocated for the storage of the scatter-gather lists. Another problem is that as the number of secondary storage drives in a RAID system increases, the more scatter-gather lists (stripe disk requests) that are needed. There is only a finite, limited amount of main memory in computer systems. The main memory being used for storage of the scatter-gather lists is permanently resident main memory which is a scarce resource of computer systems that is not permitted to be swapped in and out of the main memory. Hence, when large amounts of the permanently resident main memory are consumed by the scatter-gather lists, then there is less memory available for other operations that the computer system desires to concurrently carry out and thus processing of such other operations can be slowed.

Thus, there is a need for improved ways to access RAID memory subsystems without having to consume large amounts of main memory.

SUMMARY OF THE INVENTION

Broadly speaking, the invention relates to a technique for accessing a series of secondary storage devices where a reduced amount of main memory is needed to implement the data transfer. The invention operates to share control information stored in the main memory so that most of the main memory allocated to implementing a data transfer is shared by the series of the secondary storage drives.

The invention can be implemented in numerous ways, including as a computer system, an apparatus, and a method. Several embodiments of the invention are discussed below.

As a method for transferring data from a plurality of disk drives having data stored thereon with a stripe organization, an embodiment of the invention includes the acts of: receiving a data transfer request, the data transfer request identifies requested data to be retrieved from the disk drives; obtaining stripe control information; determining initial control information for each of the disk drives based on the data transfer request and the stripe control information; accessing the disk drives in accordance with the initial control information for each of the disk drives to obtain a portion of the requested data; and thereafter accessing the disk drives in accordance with the stripe control information to obtain a remaining portion of the requested data. Preferably, the initial control information includes at least an initial command, a length, and a next command indicator, and the stripe control information includes at least a sequence of commands for accessing data from the disk drives.

As a computer system, an embodiment of the invention includes: a plurality of disk storage devices having data striped across the disk storage devices; a main memory including random-access memory (RAM), the RAM including a permanent resident portion and a transitory portion; stripe control information stored in the RAM, the stripe control information contains at least one or more commands for data access that define the striping of the data across the disk storage devices; a virtual-to-physical address translator to translate virtual addresses to physical addresses; and a storage device controller for controlling access to the disk storage devices. The storage device controller operates to receive a data transfer request, forward the data transfer request to the virtual-to-physical address translator to produce a physical scatter-gather list for the data transfer request, determine initial control information for the physical scatter-gather list, determine subsequent control information for the physical scatter-gather list from the stripe control information, and access each of the disk storage devices in accordance with the initial control information and then in accordance with the subsequent control information.

As a computer system, another embodiment of the invention includes: a plurality of disk storage devices having data striped across the disk storage devices; a main memory including random-access memory (RAM), the RAM including a permanent resident portion and a transitory portion; stripe control information stored in the RAM, the stripe control information contains at least one or more commands for data access that define the striping of the data across the disk storage devices; virtual-to-physical address translator to translate virtual addresses to physical addresses; and a storage device controller for controlling access to the disk storage devices. The storage device controller receives a data transfer request and includes: means for forwarding the data transfer request to the virtual-to-physical address translator to produce a physical scatter-gather list for the data transfer request; means for determining initial control information for the physical scatter-gather list; means for determining subsequent control information for the physical scatter-gather list from the stripe control information; and means for accessing each of the disk storage devices in accordance with the initial control information and then in accordance with the subsequent control information.

As a computer readable medium containing program instructions for transferring data from a plurality of disk drives having data stored thereon in a striped manner, the computer readable medium comprises: computer readable code devices for receiving a data transfer request, the data transfer request identifies requested data to be retrieved from the disk drives; computer readable code devices obtaining stripe control information; computer readable code devices for determining initial control information for each of the disk drives based on the data transfer request and the stripe control information; computer readable code devices for accessing the disk drives in accordance with the initial control information for each of the disk drives to obtain a portion of the requested data; and computer readable code devices for thereafter accessing the disk drives in accordance with the stripe control information to obtain a remaining portion of the requested data.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to a technique for accessing a series of secondary storage devices where a reduced amount of main memory is needed to implement the data transfer. The invention operates to share control information stored in the main memory so that most of the main memory allocated to implementing a data transfer is shared by the series of the secondary storage drives.

Embodiments of the invention are discussed below with reference to FIGS. 2–5. However, those skilled in the art will readily appreciate that the detailed description given herein with respect to these figures is for explanatory purposes as the invention extends beyond these limited embodiments.

Figure 2:
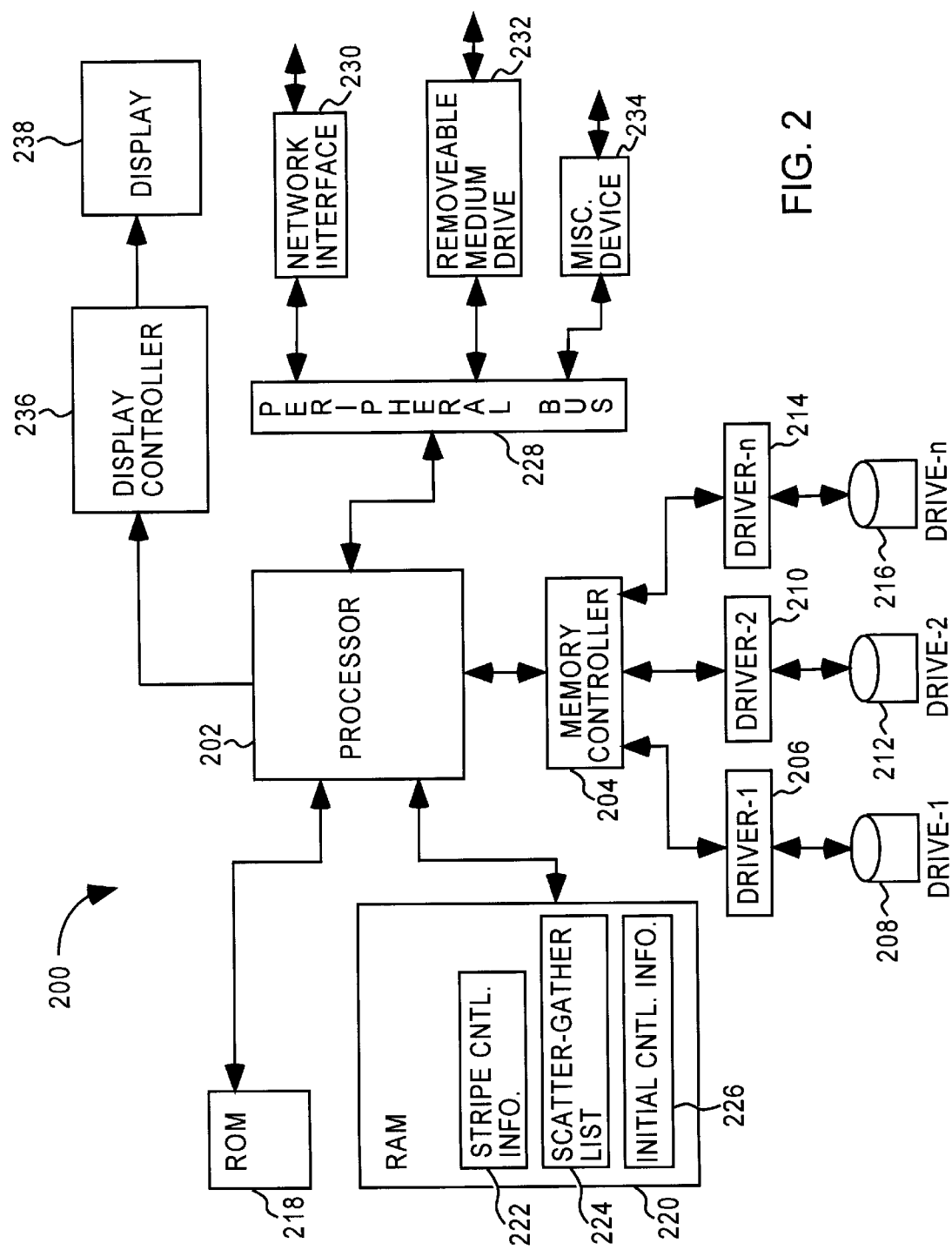
FIG. 2 is a block diagram of a computer system according to an embodiment of the invention.

FIG. 2 is a block diagram of a computer system 200 according to an embodiment of the invention. The computer system 200 can, for example, be a personal computer, a workstation computer, a mini-computer, or a network computer. The computer system 200 includes a processor 202 which controls the overall function and operation of the computer system 200. The processor 202 is, for example, a microprocessor or a central processing unit (CPU). The processor 202 couples to a memory controller 204. The memory controller 204 operates in conjunction with drivers to control disk drives. In particular, the memory controller 204 uses a driver-1 206 to control drive-1 208. In addition, the memory controller 204 uses a driver-2 210 to control the drive-2 212, and uses a driver-n 214 to control a drive-n 216. In this embodiment, the disk drives 208, 212 and 216 are utilized so as to form a Redundant Array of Inexpensive Disks (RAID). Hence, data is striped across the disk drives 208, 212 and 216. Also, the memory controller 204 can be considered a RAID controller.

The processor 202 also couples to Read-Only Memory (ROM) 218 and a Random Access Memory (RAM) 220. The ROM 218 stores operating system code and data but is not used for the data transfer operations. The RAM 220 is referred to as main memory and in accordance with the invention stores certain information to facilitate access of data that is distributed across the disk drives 208, 212 and 216. Specifically, the RAM 220 includes stripe control information 222, a scatter-gather list 224, and initial control information 226. Of course, the RAM 220 will also contain various other data needed by the computer system 200. Some of the data stored in the RAM 220 is permanently resident, that is, once allocated it remains in main memory until de-allocated because it is not able to be swapped out of the main memory (RAM 220). A portion of the permanently resident portion of the RAM 220 is used to support disk transfer operations. The stripe control information 222, the scatter-gather list 224 and the initial control information 226 are preferably permanently resident in the RAM 220.

The RAM 220 can be accessed by a physical address or a virtual address. The physical addresses are permanent for each byte. The virtual addresses are assigned by the operating system and used by the operating system and application programs. The virtual addresses vary and the operating system maintains a table of the translations between virtual and physical addresses.

Also, although the RAM 220 needs to contain the stripe control information 222, the scatter-gather list 224 and the initial control information 226 when seeking to access the disk drives 208, 212 and 216, an operating system for the computer system 200 may allocate main memory for the storage of such information when the computer system 200 is activated (or after receiving the first data transfer request) and then continue to reuse or share the allocated main memory for all subsequent data transfers. Preferably, the stripe control information 222 and the initial control information 226 are of fixed size so that they are easily shared and therefore need not be de-allocated after a data transfer and then re-allocated for the next data transfer. It is also preferable that the main memory allocated to storing the scatter-gather list 224 be de-allocated after a data transfer and then re-allocated for subsequent data transfers because the size of the scatter-gather list will vary with the amount of data to be transferred. In general, however, the main memory can be allocated by the operating system for the stripe control information 222, the scatter-gather list 224 and the initial control information 226 at the start of each data transfer, and then de-allocated at the end of the data transfer, though the repetitive allocation and de-allocations required would slow the responsiveness of the computer system to data transfer requests.

In addition, the processor 202 couples to a peripheral bus 228. The peripheral bus is used to couple additional peripheral devices to the computer system 200. For example, the peripheral bus 228 can couple to a network interface 230, a removable medium drive 232, or some miscellaneous device 234. Further, the processor 202 couples to a display controller 236 which in turn drives a display 238.

The manner in which the computer system 200, namely the memory controller 204, utilizes the particular information stored in the RAM 220 to provide more efficient access to data stored on the disk drives 208, 212 and 216 is explained below with respect to FIGS. 3–5.

Figure 3:
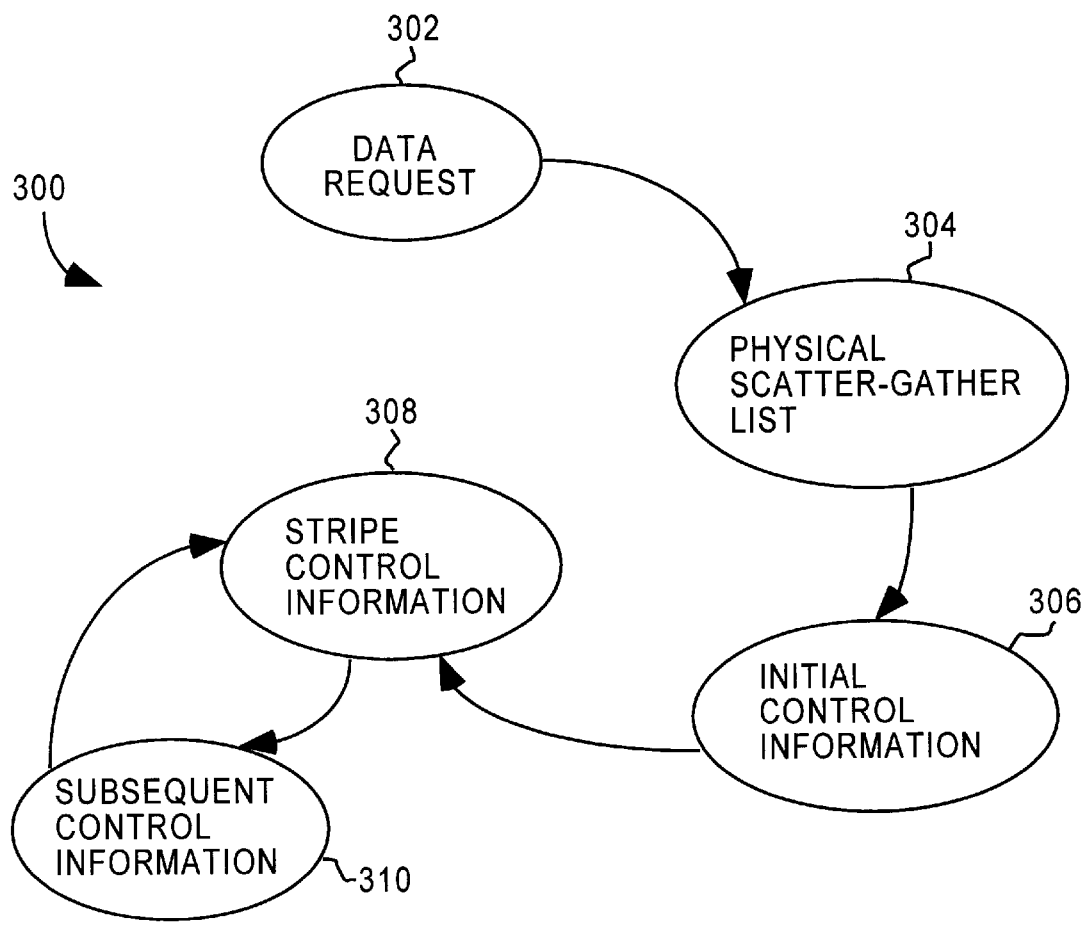
FIG. 3 illustrates a relationship of a data request and control information utilized by the invention.

FIG. 3 illustrates a relationship 300 of a data request and control information utilized by the invention. The relationship 300 initially begins with a data request 302. The data request 302 is typically provided to the computer system by a program such as an operating system or an application program. In any case, the data request 302 is used in the computer system 200 to retrieve the desired data. However, the data request typically uses virtual memory addressing. Hence, the virtual address associated with the data request 302 is converted to a physical address. Using the physical address, a physical scatter-gather list 304 is produced. The physical scatter-gather list 304 not only uses the physical address but also coordinates the physical blocks of memory that are discontiguous whereas the virtual address assumed that the memory was contiguous. Then, using the physical scatter-gather list 304, the relationship 300 indicates that initial control information 306 is produced. Given the physical scatter-gather list 304, disk block numbers, transfer lengths and stripe control information, the computer system 200 is able to determine the initial control information 306 for each of the disk drives 208, 212 and 216. The initial control information 306 is stored in main memory (i.e., permanently resident RAM 220) and can include (for each disk drive) an initial command, a transfer length, and a command indicia that references or indicates a subsequent command. The data transfer process can then begin by following the initial control information 306. After the initial control information 306 is processed to initially begin the data access to the disk drives 208, 212 and 216, stripe control information 308 must be consulted to complete the data request. The stripe control information 308 contains a sequence of repetitive commands that are associated with the structure of the RAID system including the disk drives 208, 212 and 216. Using the sequence of repetitive commands that are shared between all of the disk drives, subsequent control information 310 for each of the disk drives can be obtained. Preferably, the command indicia of the initial control information for each of the disk drives is used to index into the sequence of repetitive commands of the stripe control information 308 so that the appropriate command is selected for each of the disk drives. The data transfer in process can then continue by following the subsequent control information 310. As needed, additional subsequent control information 310 can be obtained until the data transfer has completed. Preferably, the additional subsequent control information 310 for each of the disk drives follows sequentially the sequence of repetitive commands of the stripe control information 308 (after the command indexed to by the command indicia of the initial control information of the corresponding disk drive).

Figure 4A:
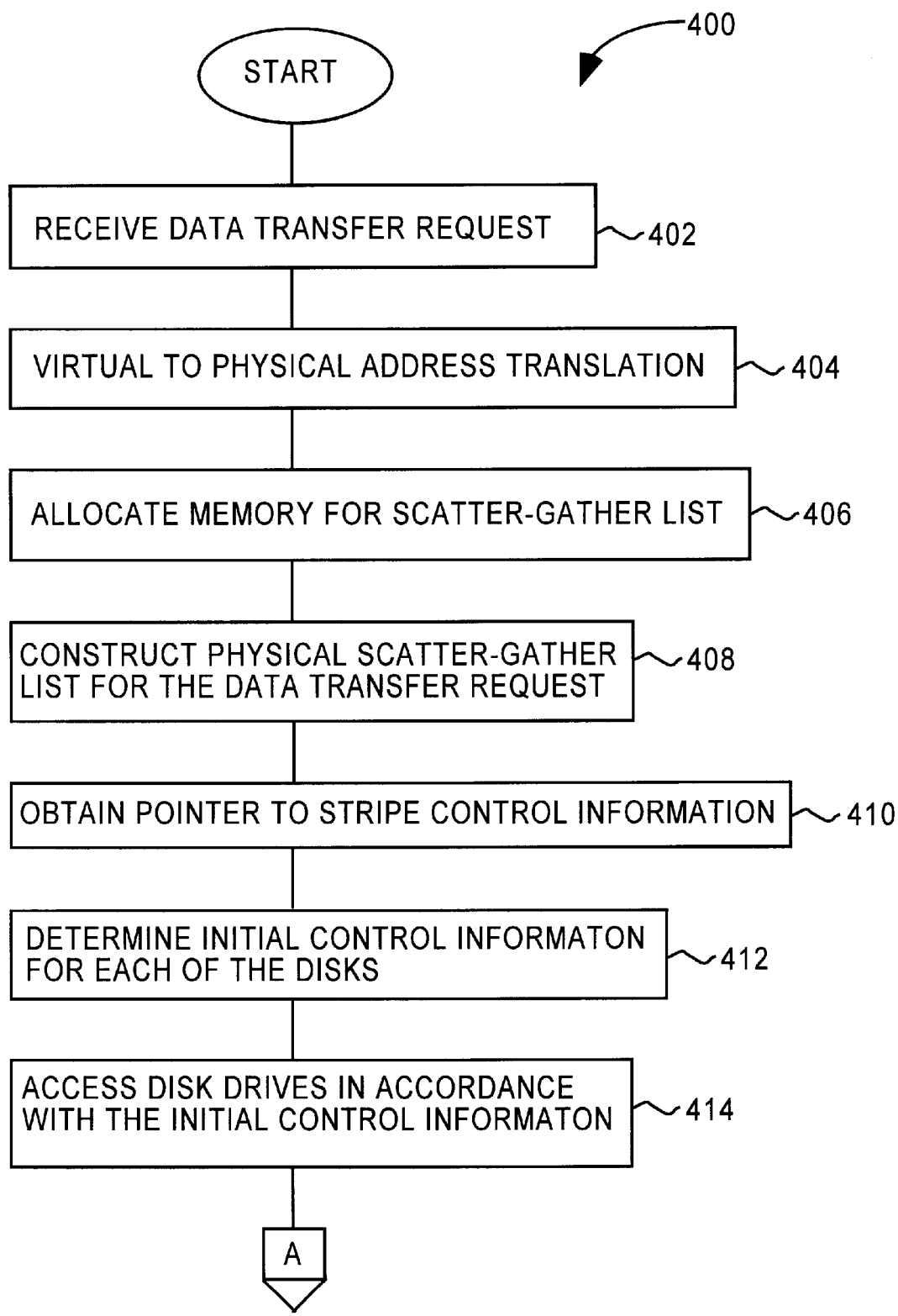
FIGS. 4A and 4B are flow diagrams of scatter-gather processing according to an embodiment of the invention.
Figure 4B:
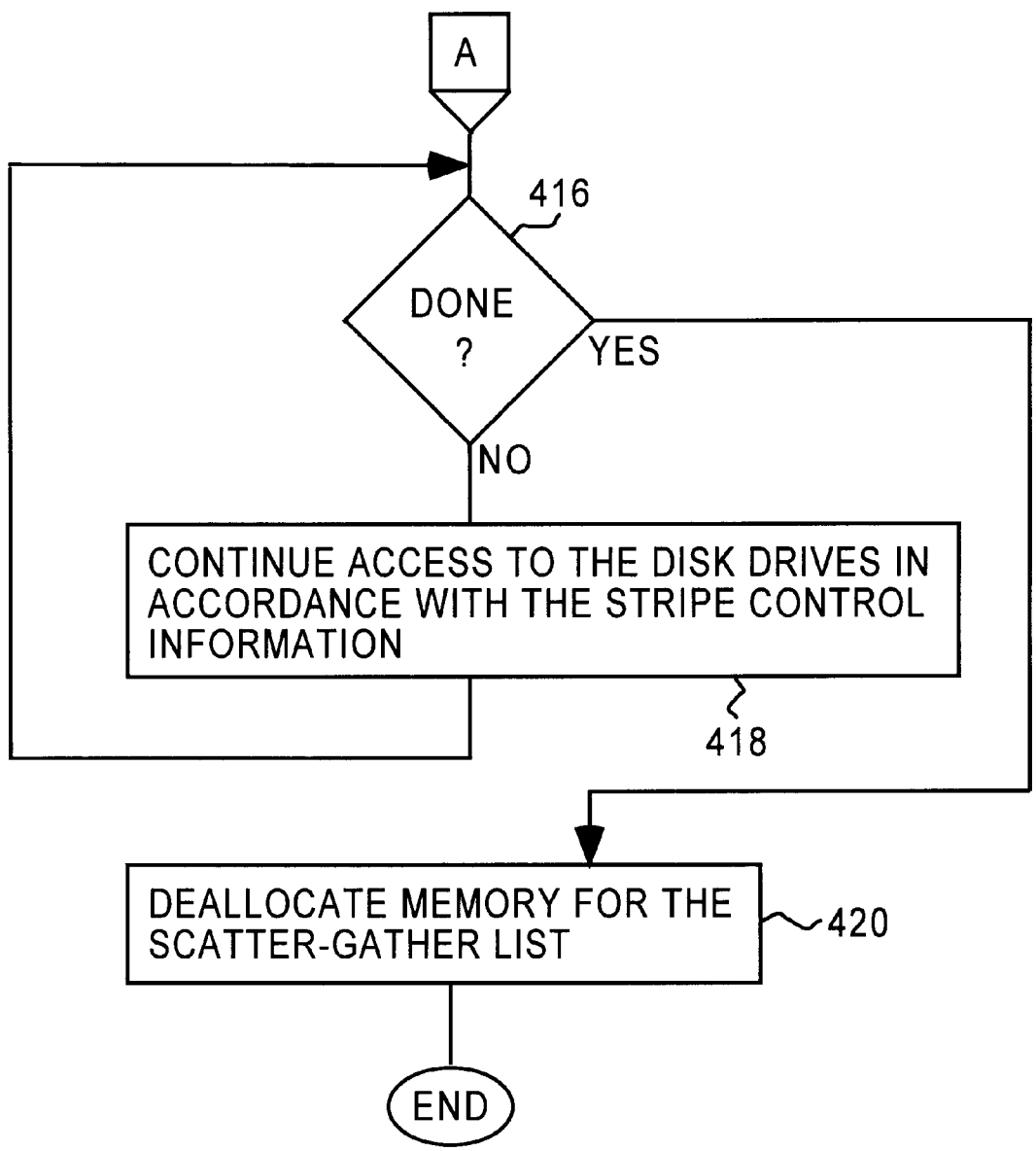

FIGS. 4A and 4B are flow diagrams of scatter-gather processing 400 according to an embodiment of the invention. The scatter-gather processing 400 is, for example, performed by the processor 202 and the memory controller 204 illustrated in FIG. 2 typically in accordance with an operating system for the computer system 200.

The scatter-gather processing 400 initially receives 402 a data transfer request. Typically, the data transfer request contains a virtual memory address and a length of data to be transferred. As an example, the data transfer request can be provided by a program (e.g., operating system, application program) being executed by the computer system 200. In this embodiment, the computer system 200 uses a virtual memory subsystem. Accordingly, the data transfer request includes the virtual memory address. The virtual memory address provided in the data transfer request is then translated 404 into a physical memory address.

Next, memory is allocated 406 for a scatter-gather list. As an example, the operating system may operate to allocate a portion of the RAM 220 for the scatter-gather list. After having allocated 406 the memory, the scatter-gather processing 400 constructs 408 a physical scatter-gather list for the data transfer request. It should be noted that the physical scatter-gather list is for the entire data transfer request, and is not produced individually for each of the disk drives.

After the scatter-gather list for the data transfer request has been formed, a pointer to stripe control information is obtained 410. As noted previously, the stripe control information contains a sequence of repetitive commands able to be shared by the disk drives. Additionally, the stripe control information also includes information that describes the organization (e.g., striping) of data on the disk drives. Then, initial control information for each of the disk drives is determined 412. Previously, during activation of the memory system, a small, fixed amount of permanently resident memory was allocated for the initial control information. Since the initial control information is a small, fixed amount, the memory can be reused with each subsequent data transfer request. Hence, there is no need to de-allocate the small, fixed amount of memory following the completion of a particular data transfer request. The initial control information is determined 412 from the disk block number and the stripe control information.

Once the initial control information has been determined 412 for each of the disk drives, the disk drives are accessed 414 in accordance with the initial control information. Then, a decision block 416 determines whether the data transfer request has been completed. If the data transfer request has not yet completed, access 418 to the disk drives continues in accordance with the stripe control information. In other words, once the data transfer has begun using the initial control information, subsequent control information is provided by the stripe control information which is able to be shared by all the disk drives. Following block 418, the scatter-gather processing 400 returns to repeat the decision block 416 and subsequent blocks. When the decision block 416 determines that the data transfer request has completed, the memory for the scatter-gather list is de-allocated 420. Following block 420, the scatter-gather processing 400 is complete and ends. Of course, as the individual disk drives are done with their portion of the data transfer, the continued access 418 is bypassed for the particular disk drives. Hence, the decision block 416 preferably determines whether all of the disk drives have completed their portion of the data transfer request.

Accordingly, instead of providing complete physical scatter-gather lists (stripe disk requests) for all of the disk drives, the memory controller 204 need only receive the physical address that each of the disk drives should begin the data transfer process from and a length (a number of bytes). The physical address and the length are contained in the initial control information that is provided for each of the disk drives. Following the initial control information, subsequent control information is obtained from the stripe control information that is being shared by all of the disk drives. The amount of main memory needed for the initial control information and the stripe control information is fixed and substantially smaller than the variable amount of memory conventionally required to provide scatter-gather lists for each of the disk drives. In other words, the amount of memory allocated 406 is reduced as compared to the amount that would be conventionally required if individual scatter-gather tables (stripe disk requests) were used for each of the disk drives.

To illustrate the operation of the invention, three data transfers are described below. Each of the data transfers is for a single memory extent beginning at virtual address 10120 (hexadecimal) for 6144 (decimal) bytes starting at disk block 7. It is assumed that addresses are in hexadecimal notation and that block numbers and transfer lengths are in decimal notations.

Figure 1:
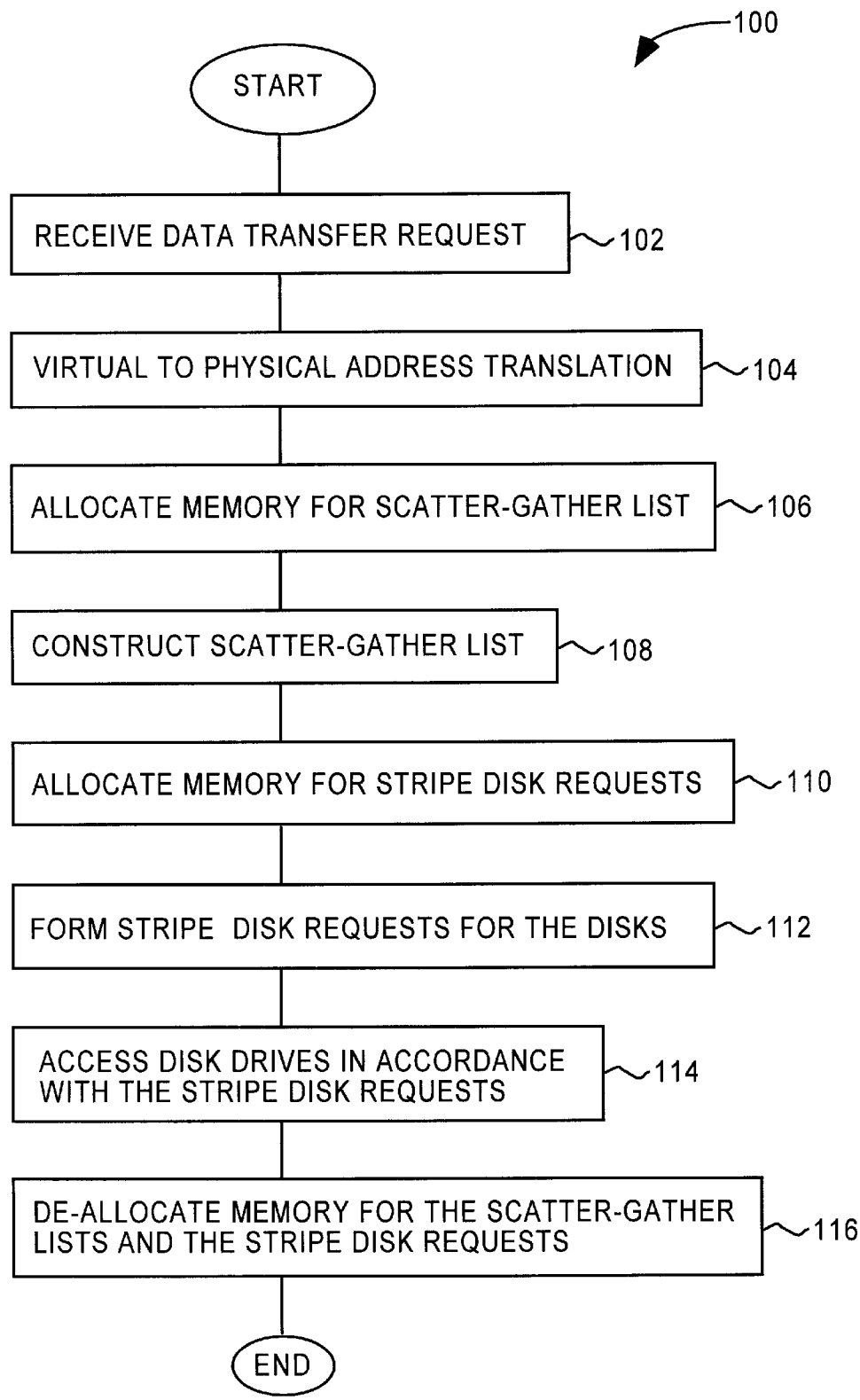
FIG. 1 is a flow diagram of scatter-gather accessing of disk drives according to a conventional approach.
Figure 5:
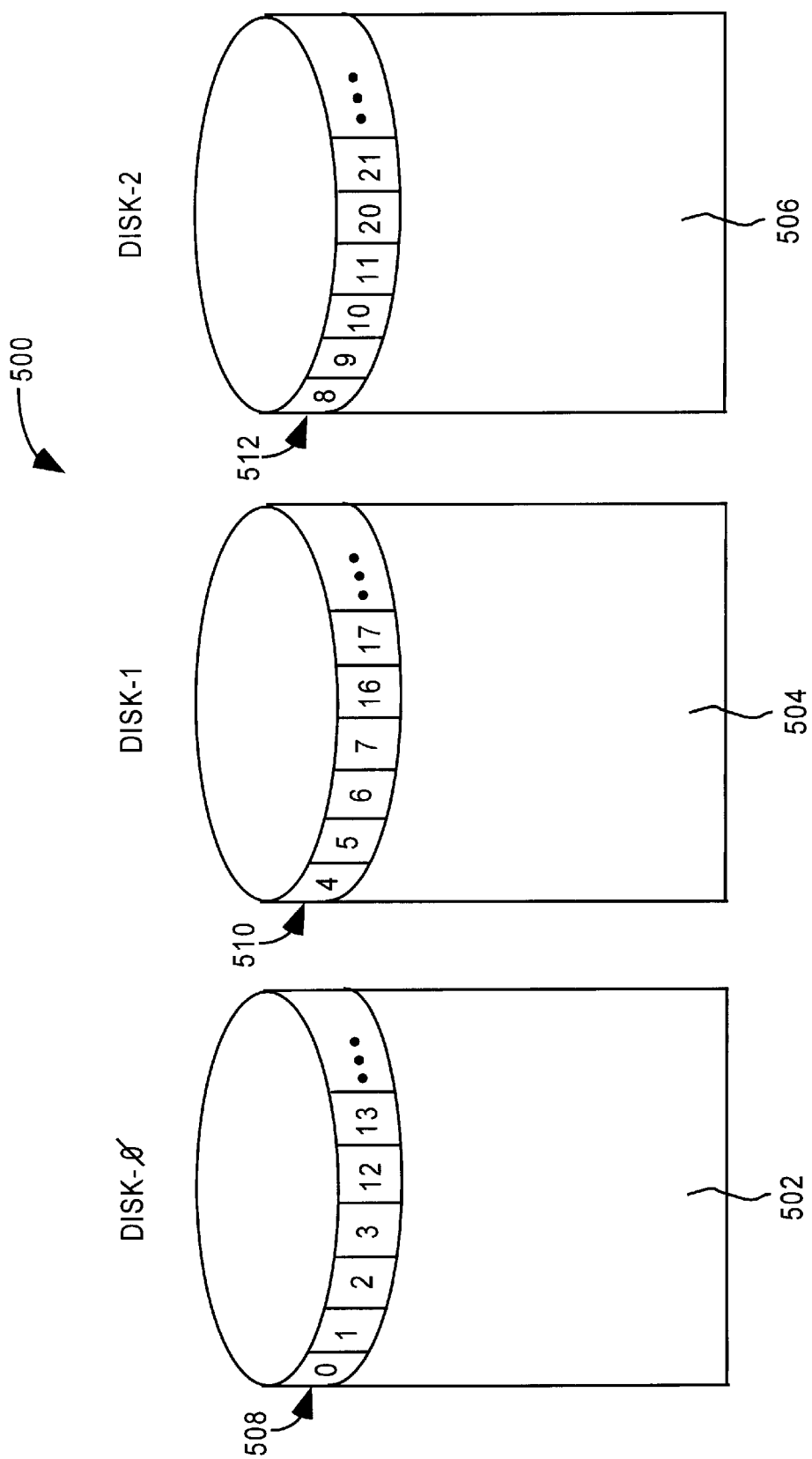
FIG. 5 is a diagram of a RAID system for a computer system.

The first data transfer example is for a conventional non-striped transfer, the second data transfer example is for the same transfer striped over the disk organization shown in FIG. 5 according to the conventional approach outlined in FIG. 1, and the third data transfer example is for the same transfer using the present invention. These examples are presumed to be carried out by a computer system having a structure similar to the computer system 200 illustrated in FIG. 2. Although the computer system 200 performs the third data transfer example according to the invention, the same basic overall structure of the computer system (e.g., the memory controller 204, disk drivers 206, 210 and 214 and disk drives 208, 212 and 216) are similarly used and referenced with respect the first and second data transfer examples.

The examples here presume that the original data transfer request is for a single extent of memory, i.e., a single starting address and number of bytes to transfer. As is well known to those skilled in the art, the original data transfer request may actually be for a collection of address-length pairs, called a scatter-gather list. The examples here further assume that each disk block (or sector) contains 512 bytes and that virtual memory is organized into physical segments ("pages") of 4096 bytes. These values for the block size and the page size are typical values, but other values are often used. The data transfer in the example will transfer 12 disk blocks (6144÷512=12).

Because the disk devices, under management of the memory controller 204, only use physical addresses, the original transfer request must be converted to a physical scatter-gather table. The virtual address 10120 (hexadecimal) is not aligned (congruent) to a page boundary. It is 120 (hexadecimal) bytes or 288 (decimal) bytes beyond the page boundary start of 10000 (hexadecimal). A possible virtual to physical scatter-gather list is shown in Table 1.

TABLE 1

| VIRTUAL ADDR. | PHYSICAL ADDR. | LENGTH |
|---|---|---|
| 10120 | ABC10120 | 3808 |
| 11000 | DEF11000 | 2336 |

Table 1 shows that the 6144 byte memory range beginning at virtual address 10120 extends across two physical pages, the first physical page beginning at physical address ABC10000 and the second physical page beginning at physical address DEF11000. The start of the requested transfer at virtual address 10120 is thus at physical address ABC10120 and extends for 3808 bytes to the end of the first physical page, and then the requested transfer is at the physical address DEF11000 and extends for 2336 bytes. The length value 3808 is the number of bytes from the starting address to the end of the physical memory page containing the starting address. This particular length value is computed by subtracting the page boundary offset 288 (decimal) from the page length 4096. The next page begins on a page boundary (DEF11000) and completes the requested transfer of 2336 (6144−3808=2336) bytes. Note that the two physical pages are not contiguous: this is normal and expected in modern computer systems using virtual memory subsystems.

The first data transfer example represents how this data transfer might be carried out in a non-striping configuration. The memory controller 204 converts the original virtual address and length to the physical scatter-gather table shown in Table 1. The memory controller 204 would then instruct the appropriate disk driver 206, 210 or 214 to carry out the data transfer on the associated disk 208, 212 or 216, respectively. The command sent to the disk would, for example, contain the information shown in Table 2.

TABLE 2

| Command: | read or write, as appropriate | |
|---|---|---|
| Starting block: | | 7 |
| Number of blocks: | | 12 |
| Total Number of bytes: | | 6144 |
| Scatter-gather list: | Virtual address | Physical address | Length |
| | 10120 | ABC10120 | 3808 |
| | 11000 | DEF11000 | 2336 |

Accordingly, to carry out this data transfer request, the memory controller 204 converts the data request to a two-element scatter-gather list shown in Table 1. In general, for any transfer of length N bytes, a maximum of (2+(N÷[page size])) scatter-gather list elements will be needed. The additional two elements may be needed to compensate for virtual addresses that are not aligned to page boundaries or for transfer lengths that are not proper multiples of page boundaries.

With the second data transfer example, the same data transfer request is serviced but the data stored on the disks in a striped manner. The organization of the data on the disks is described below with reference to FIG. 5. The second data transfer example is performed in accordance with the conventional scatter-gather accessing 100 illustrated in FIG. 1. In this case, the memory controller 204 uses the stripe disk configuration information to construct an independent scatter-gather list (stripe disk requests) for each disk that will participate in the transfer. It then commands each disk driver to carry out the operations. When all disk drivers have finished their portion of the overall request, the memory controller 204 communicates with the operating system of the computer system 200 to inform the original requester that the data transfer request is complete.

FIG. 5 is a diagram of a RAID system 500 for a computer system. The RAID system 500 includes three disks, namely, disk-0 502, disk-1 504, and disk-2 506. Data is striped across the three disks in stripe elements consisting of four blocks of data. For purposes of discussion, it is assumed that each block contains 512 bytes and that each stripe element contains four blocks (i.e., 2048 bytes). Also, for purposes of discussion, it is assumed that the RAM of the computer system is organized into pages of 4096 bytes. As shown in FIG. 5, data including blocks 0 through n blocks of data are striped across the three disks such that blocks 0–3 of the first stripe segment are stored on the disk-0 502 beginning at disk-0 block 0, blocks 4–7 of the second stripe segment are stored on the disk-1 504 beginning at disk-1 block 0, and blocks 8–11 of the third stripe segment are stored on the disk-2 506 beginning at disk-2 block 0. Then, the sequence repeats with blocks 12–15 of the fourth stripe segment stored on the disk-0 502 beginning at disk-0 block 4, blocks 16–19 of the fifth stripe segment stored on the disk-1 504 beginning with disk-1 block 4, and blocks 20–23 of the sixth stripe segment stored on the disk-2 506 beginning with disk-2 block 4. This sequence of storing the stripe segments continues until all the stripe segments have been stored.

Assume that an application program requests a data transfer beginning at virtual address hexadecimal 10120 (decimal 65824) of length 6144 (decimal) bytes, starting at user disk sector 7. Given the RAID system 500, the 6144 bytes correspond to 12 blocks and these blocks are found on the three disks 502–506 as shown in FIG. 5.

By executing operations 104–112 of the conventional scatter-gather accessing 100 shown in FIG. 1, the memory controller 204 determines the disk and disk sector corresponding to user disk sector 7. As shown in FIG. 5, user disk sector 7 corresponds to disk block 3 on drive-1 504. The location of all remaining blocks can then be determined from the structure of the RAID system 500. Namely, in this example, the other blocks to be transferred are the sequential blocks 8 through 18. More specifically, the blocks to be transferred are as indicated in Table 3.

TABLE 3

| VIRTUAL ADDR. | LENGTH | USER BLOCK | STRIPE DISK | BLOCK |
|---|---|---|---|---|
| 10120 | 512 | 7 | 1 | 3 |
| 10320 | 2048 | 8–11 | 2 | 0 |
| 10B20 | 2048 | 12–15 | 0 | 4 |
| 11320 | 1536 | 16–18 | 1 | 4 |

The virtual address is the address in the RAM 220 as provided in the original data transfer request. Because the data transfer request will be serviced by the three disks 502, 504 and 506 in the stripe configuration, the data transfer request is separated into four distinct segments, two to be serviced by disk-1 504, one to be serviced by disk-0 502, and one to be serviced by disk-2 506. Note that the total number of blocks to be transferred indicated in Table 3 totals to twelve (12), the amount requested.

Using the information in Table 3 and the logical to physical translation information contained in Table 1, the memory controller 204 constructs three independent scatter-gather lists when executing steps (b)locks 110–112 of FIG. 1). The memory controller 204 then executes block 114 of FIG. 1 by instructing the associated disk drivers (e.g., drivers 206, 210 and 214) to carry out independent requests on disks 502, 504 and 506 (which respectively correspond to disks 208, 212 and 216). When the independent requests complete, the memory controller 204 executes block 116 to release all the memory needed for storing the scatter-gather lists. Tables 4A, 4B and 4C below show the information within the scatter-gather lists that is provided to the respective disk driver.

Because the computer system uses virtual memory, the virtual memory addresses must be correlated with the physical memory addresses. The scatter-gather list indicates where the data to be transferred is located, and the length of data to be transferred to memory starting at a specified physical address. Note, in particular, that the scatter-gather lists for disk-0 502 and disk-1 504 each require two elements. In the case of disk-0 502, two elements are needed because the contiguous virtual address sequence beginning at virtual address 10B20 is stored in discontiguous physical pages. In the case of disk-1 504, two elements are needed because the striping algorithm must store data into two discontiguous virtual addresses, one beginning at virtual address 10120 and the other at virtual address 11320.

The above example, as shown in Tables 4A–4C, requires an individual scatter-gather list for at least each disk in the stripe configuration. Here, since disk-0 and disk-1 require two elements, each would have two scatter-gather lists, and thus a total of five scatter-gather elements would be used. In a practical configuration, this example will also require another scatter-gather list with two elements as shown in Table 1.

The third data transfer example is now described. The third data transfer example carries out the same data transfer request as did the first and second examples. However, the processing performed in carrying out the third data transfer example is done in accordance with the present invention. The improved procedure according to the invention only constructs the initial scatter-gather list. For this example, the initial scatter-gather list contains two elements and is as shown in Table 1.

Next, a pointer to the stripe control information is obtained. The stripe control information includes a repetitive sequence of commands. Typically, the stripe control information 222 is stored in permanently resident main memory 220. The memory controller 204 is provided with a pointer to the start of the stripe control information 222 within the main memory 220. Using the disk organization in FIG. 5 as an example, the stripe control information could be as provided in Table 5 below:

TABLE 4A

| Disk Driver | Disk Drive | Starting Block | Length in Blocks | Length in Bytes | Physical Address | Virtual Address |
|---|---|---|---|---|---|---|
| 206 | disk-0 | 4 | 4 | 1248 | ABC10B20 | 10B20 |
|  |  |  |  | 800 | DEF11000 | 11100 |

TABLE 4B

| Disk Driver | Disk Drive | Starting Block | Length in Blocks | Length in Bytes | Physical Address | Virtual Address |
|---|---|---|---|---|---|---|
| 210 | disk-1 | 3 | 4 | 512 | ABC10120 | 10120 |
|  |  |  |  | 1536 | DEF11320 | 11320 |

TABLE 4C

| Disk Driver | Disk Drive | Starting Block | Length in Blocks | Length in Bytes | Physical Address | Virtual Address |
|---|---|---|---|---|---|---|
| 214 | disk-2 | 8 | 4 | 2048 | ABC10320 | 10320 |

TABLE 5

| INDEX | COMMAND | LENGTH |
|-------|---------|--------|
| 0 | Transfer | 2048 |
| 1 | Skip | 2048 |
| 2 | Skip | 2048 |
| 3 | Repeat from index | 0 |

Each element of the stripe control information block contains two fields, a command field and a length field. The commands in this example are Transfer, Skip, and Repeat, and the lengths for the Transfer and Skip commands are all 2048 in this example. The end of the stripe control information is indicated by a Repeat command that signals that the next command is obtained by repeating the sequence of commands from the beginning (i.e., index 0, which specifies Transfer 2048 bytes). The Repeat command, in this example, stores the command index in its length field. However, practitioners may choose to use other information, such as the address of the destination element or address offset, with the Repeat command.

It should be noted that the Transfer, Skip and Repeat commands are sufficient for striping memory systems with RAID-0 configurations. However, for more sophisticated RAID configurations that use parity sectors or mirrored configurations, additional commands and data fields would typically be defined in order to control and manage these more complex organizations.

Then the system determines the initial control information for each of the disk drives. In one embodiment, the initial control information includes an initial command, an initial length, and a next command. For this example, the initial control information for disk-0 is provided in Table 6, the initial control information for disk-1 is provided in Table 7, and the initial control information for disk-2 is provided in Table 8.

TABLE 6

| INITIAL COMMAND | INITIAL LENGTH | NEXT COMMAND |
|-----------------|----------------|--------------|
| Skip | 2560 | 0 |

TABLE 7

| INITIAL COMMAND | INITIAL LENGTH | NEXT COMMAND |
|-----------------|----------------|--------------|
| Transfer | 512 | 1 |

TABLE 8

| INITIAL COMMAND | INITIAL LENGTH | NEXT COMMAND |
|-----------------|----------------|--------------|
| Skip | 512 | 0 |

Consider then the operation of disk-0. The initial command is then Skip 2560 bytes in accordance with the initial control information (see Table 6). The next command is then Transfer 2048 bytes as identified by the next command indicator of "0" in Table 6 that points to the first entry in Table 5. Thereafter, in accordance with the stripe control information in Table 5, the next command is Skip 2048 bytes, which actually skips only 1536 bytes because at that point the data transfer request is completed. Note that had the data transfer request been longer, the next command would have been Skip 2048 bytes, and for the next command the Repeat indicator would signal a return to the command Transfer 2048 bytes, and so on.

For the disk-1, the initial command is Transfer 512 bytes in accordance with the initial control information (see Table 7). The next command is then Skip 2048 bytes as identified by the next command indicator of "1" in Table 7 that points to the second entry in Table 5. Thereafter, in accordance with the stripe control information in Table 5, the next command is Skip 2048 bytes. The next command is then Transfer 2048 bytes according to the stripe control information in Table 3, which actually transfers only 1536 bytes because at that point the data transfer request is completed.

For the disk-2, the initial command is Skip 512 bytes in accordance with the initial control information (see Table 8). The next command is then Transfer 2048 bytes as identified by the next command indicator of "0" in Table 8 that points to the first entry in Table 5. Thereafter, in accordance with the stripe control information in Table 3, the next command is Skip 2048 bytes. The next command is then Skip 2048 bytes according to the stripe control information in Table 3, which actually skips only 1536 bytes because at that point the data transfer request is completed.

Although the above-described example concerns retrieving data from the RAID system, the processing likewise operates to save data to the RAID system. The specific format, arrangement or contents of the initial control information or scatter-gather list may take various forms. As an example, the initial control information may be provided either by explicitly specifying the command, length, and next command (index) as in the example above, or by specifying an initial number of bytes to skip in main memory and an initial number of bytes to skip within the stripe control block. Then the system determines the initial control system for each of the disk drives. In such an embodiment, the initial control information for disk-1 would for the above example be as provided in Table 9, the initial control information for disk-2 would for the above example be as provided in Table 10, and the initial control information for disk-3 would for the above example be as provided in Table 11.

TABLE 9

| Disk Drive | Starting Block | Length in Blocks | Length in Bytes | Initial Memory Skip | Initial Stripe Control Block Skip |
|------------|----------------|------------------|-----------------|---------------------|------------------------------------|
| disk-0 | 4 | 4 | 2048 | 2560 | 0 |

TABLE 10

| Disk Drive | Starting Block | Length in Blocks | Length in Bytes | Initial Memory Skip | Initial Stripe Control Block Skip |
|------------|----------------|------------------|-----------------|---------------------|------------------------------------|
| disk-1 | 3 | 4 | 2048 | 0 | 1536 |

TABLE 11

| Disk Drive | Starting Block | Length in Blocks | Length in Bytes | Initial Memory Skip | Initial Stripe Control Block Skip |
|---|---|---|---|---|---|
| disk-2 | 8 | 4 | 2048 | 512 | 0 |

Note that since block 7 is the first block needed from disk-1, there is no Skip initially; however, there is a physical address skip of 1536 bytes to address block 7 (physical block 4). As for disk-0, the initial memory skip is 2560 (512+2048) as the first block needed from disk-0 is block 12 (hence blocks 7–11 are effectively skipped), and there is a physical address skip of 0 bytes to address block 12 (physical block 5). As for disk-2, the initial memory skip is 512 bytes as the first block needed from disk-2 is block 8 (hence only block 7 is effectively skipped), and there is a physical address skip 0 bytes to address block 8 (physical block 0).

The striping of data across multiple secondary storage devices as discussed above is also referred to as RAID-0. However, the invention equally applies to other enhanced versions of RAID that provide redundancy and reliability improvements such as parity and mirroring.

The invention has numerous advantages. Overall, the invention uses less resources of main memory and requires less allocation and de-allocation of memory for each data request. The ability to utilize less main memory to implement a data transfer is advantageous in that it allows additional memory to be used for other purposes. Further, with large data transfers, the scatter-gather lists (stripe disk requests) that were conventionally required for each of the different disk drives could themselves consume a large amount of the main memory, which negatively impacts the performance of the computer system.

In addition, the invention preferably uses fixed length memory structures for the initial control information, such as illustrated in either Tables 6–8 or Table 9–11. The advantages of fixed length control structures are that they are independent of the length and character of each individual transfer, that they can be allocated once, and then continuously reused. By not having to continuously reallocate memory structures, processing time is saved and efficiency of the computer system is improved. The stripe control information is allocated once when the striped disk system is instantiated and can be shared across all disk drivers by providing a reference to the shared data.

Further, another advantage of the invention is that the original scatter-gather list as constructed by the original requesting procedure, and as shown in the above example, the scatter-gather list (Table 1) is constructed once and shared among the disk drivers. This invention does not require constructing individual scatter-gather lists for each disk drive in the striping set as was needed by the conventional procedure and as illustrated in Tables 4A–4C above. Even in the small data transfer example discussed above, the conventional implementation requires over twice as much memory storage for scatter-gather elements than does the example illustrating the invention.

Still another advantage of the invention is that a copy of the stripe control information or a reference to its location in permanently resident RAM, together with a reference to the original scatter-gather list (Table 1) (or similar information) can optionally be passed to a processor, such as DMA controller, for carrying out the data transfer and thus free the main processor from the burdens of monitoring and processing the data transfer.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for accessing a plurality of disk drives having data stored thereon with a stripe organization, said method comprising:

(a) receiving a data transfer request, the data transfer request identifies requested data to be retrieved from the disk drives;

(b) obtaining stripe control information, the stripe control information including at least a sequence of commands for accessing data from the disk drives;

(c) determining initial control information for each of the disk drives based on the data transfer request and the stripe control information, the initial control information including at least an initial command, a length and a next command indicator;

(d) accessing the disk drives in accordance with the initial control information for each of the disk drives to obtain a portion of the requested data; and (e) thereafter accessing the disk drives in accordance with the stripe control information to obtain a remaining portion of the requested data, said accessing (e) comprising (e1) for each of the disk drives, selecting one of the sequence of commands in the stripe control information based on the next command indicator;

(e2) respectively accessing each of the disk drives in accordance with the selected command for each of the disk drives; and (e3) subsequently, respectively accessing each of the disk drives in accordance with the commands sequentially following the selected command in the stripe control information for each of the disk drives.

2. A method as recited in claim 1, wherein the initial control information includes at least an initial command, a length, and a next command indicator.

3. A method as recited in claim 1, wherein the stripe control information is shared by the disk drives.

4. A method for accessing a plurality of disk drives having data stored thereon with a stripe organization, said method comprising:

(a) receiving a data transfer request, the data transfer request identifies requested data to be retrieved from the disk drives;

(b) obtaining stripe control information, the stripe control information including at least a sequence of commands for accessing data from the disk drives;

(c) determining initial control information for each of the disk drives based on the data transfer request and the stripe control information, the initial control information including at least an initial command, a length and a next command indicator;

(d) accessing the disk drives in accordance with the initial control information for each of the disk drives to obtain a portion of the requested data; and (e) thereafter accessing the disk drives in accordance with the stripe control information to obtain a remaining portion of the requested data said accessing (e) of the disk drives being performed in accordance with the sequence of commands, and the next command indicator pointing to one of the commands in the sequence of commands where the next command following the initial command is obtained.

5. A method as recited in claim 4, wherein subsequent next commands are obtained from the sequence of commands as those that sequentially follow the next command.

6. A method as recited in claim 5, wherein the sequence of commands is a repetitive sequence of commands.

7. A method as recited in claim 6, wherein the commands within the sequence of commands include at least a skip command and a transfer command.

8. A method as recited in claim 7, wherein the commands within the sequence of commands further includes a repeat command.

9. A method as recited in claim 4, wherein the stripe control information is shared by the disk drives.

10. A method as recited in claim 4, wherein the stripe control information is constructed into a table when the disk drives are instantiated and thereafter subsequently utilized for data access by each of the disk drives.

11. A method as recited in claim 4, wherein said obtaining (b) of the stripe control information comprises:
   determining the stripe control information based on the stripe organization for the data storage on the disk drives.

12. A method as recited in claim 11, wherein said method is performed by a computer system, and
   wherein the plurality of disk drives form a redundant array of inexpensive disks (RAID) organization.

13. A method as recited in claim 12, wherein said determining of the stripe control information occurs when the RAID organization is instantiated and is thereafter not modified during operation of the computer system.

14. A computer system, comprising:
   a plurality of disk storage devices having data striped across said disk storage devices;
   a main memory including random-access memory (RAM), the RAM including a permanent resident portion and a transitory portion;
   stripe control information stored in the RAM, said stripe control information contains at least one or more commands for data access that define the striping of the data across said disk storage devices;
   a virtual-to-physical address translator to translate virtual addresses to physical addresses; and
   a storage device controller for controlling access to said disk storage devices, said controlling including receiving a data transfer request, forwarding the data transfer request to said virtual-to-physical address translator to produce a physical scatter-gather list for the data transfer request, determining initial control information for the physical scatter-gather list, determining subsequent control information for the physical scatter-gather list from the stripe control information, and accessing each of said disk storage devices in accordance with the initial control information and then in accordance with the subsequent control information, said accessing in accordance with the subsequent control information comprising (i) for each of the disk drives, selecting one of the commands in the subsequent control information, (ii) respectively accessing each of the disk drives in accordance with the selected command for each of the disk drives, and (iii) subsequently, respectively accessing each of the disk drives in accordance with the commands sequentially following the selected command in the subsequent control information for each of the disk drives.

15. A computer system as recited in claim 14, wherein the initial control information provides at least a disk command, and
   wherein the stripe control information includes at least a sequence of commands for accessing data from the disk drives.

16. A computer system as recited in claim 15,
   wherein the stripe control information is constructed into a table when the disk drives are instantiated and thereafter subsequently utilized for data access by each of the disk drives.

17. A computer system as recited in claim 14, wherein the plurality of disk drives form a redundant array of inexpensive disks (RAID).

18. A computer system as recited in claim 14, wherein said storage device controller determines the initial control information based on the stripe control information.

19. A computer system, comprising:
   a plurality of disk storage devices having data striped across said disk storage devices;
   a main memory including random-access memos (RAM), the RAM including a permanent resident portion and a transitory portion;
   stripe control information stored in the RAM, said stripe control information contains at least one or more commands for data access that define the striping of the data across said disk storage devices;
   virtual-to-physical address translator to translate virtual addresses to physical addresses; and
   a storage device controller for controlling access to said disk storage devices, said controlling receives a data transfer request and includes,
      means for forwarding the data transfer request to said virtual-to-physical address translator to produce a physical scatter-gather list for the data transfer request;
      means for determining initial control information for the physical scatter-gather list;
      means for determining subsequent control information for the physical scatter-gather list from the stripe control information; and
      means for accessing each of said disk storage devices in accordance with the initial control information and then in accordance with the subsequent control information,
   wherein said means for accessing operates to access the disk storage devices in accordance with the subsequent control information comprising (i) for each of the disk drives, selecting one of the commands in the subsequent control information, (ii) respectively accessing each of the disk drives in accordance with the selected command for each of the disk drives, and (iii) subsequently, respectively accessing each of the disk drives in accordance with the commands sequentially following the selected command in the subsequent control information for each of the disk drives.

20. A computer readable medium containing program instructions for accessing a plurality of disk drives having data stored thereon in a striped manner, said computer readable medium comprising:
   computer readable code devices for receiving a data transfer request, the data transfer request identifies requested data to be retrieved from the disk drives;

computer readable code devices obtaining stripe control information, the stripe control information including at least a sequence of commands for accessing data from the disk drives;

computer readable code devices for determining initial control information for each of the disk drives based on the data transfer request and the stripe control information, the initial control information including at least an initial command a length and a next command indicator;

computer readable code devices for accessing the disk drives in accordance with the initial control information for each of the disk drives to obtain a portion of the requested data; and computer readable code devices for thereafter accessing the disk drives in accordance with the stripe control information to obtain a remaining portion of the requested data, the accessing operates to (i) for each of the disk drives, selecting one of the sequence of commands in the stripe control information based on the next command indicator, (ii) respectively accessing each of the disk drives in accordance with the selected command for each of the disk drives, and (iii) subsequently, respectively accessing each of the disk drives in accordance with the commands sequentially following the selected command in the stripe control information for each of the disk drives.

21. A computer readable medium as recited in claim 20, wherein the initial control information includes at least an initial command, a length, and a next command indicator.

22. A computer readable medium as recited in claim 20, wherein the stripe control information is shared by the disk drives.

23. A computer readable medium as recited in claim 20, wherein the initial control information provides at least a disk command, and wherein the stripe control information includes at least a sequence of commands for accessing data from the disk drives.

24. A computer readable medium as recited in claim 23, wherein the stripe control information is constructed into a table when the disk drives are instantiated and thereafter subsequently utilized for data access by each of the disk drives.

25. A computer readable medium as recited in claim 23, wherein the plurality of disk drives form a redundant array of inexpensive disks (RAID) organization, and wherein said computer readable code devices for obtaining the stripe control information include computer readable program code to determine the stripe control information based on the stripe organization for the data storage on the disk drives.

26. A computer readable medium as recited in claim 25, wherein the RAID organization is part of a computer system, and wherein said computer readable program code to determine the stripe control information determines the stripe control information once when the RAID organization is instantiated and is thereafter not modified during operation of the computer system.

27. A computer readable medium containing program instructions for transferring data from a plurality of disk drives having data stored thereon in a striped manner said computer readable medium comprising:

computer readable code devices for receiving a data transfer request, the data transfer request identifies requested data to by retrieved from the disk drives;

computer readable code devices obtaining stripe control information, the stripe control information including at least a sequence of commands for accessing data from the disk drives;

computer readable code devices for determining initial control information for each of the disk drives based on the data transfer request and the stripe control information, the initial control information including at least an initial command, a length and a next command indicator;

computer readable code devices for accessing the disk drives in accordance with the initial control information for each of the disk drives to obtain a portion of the requested data; and computer readable code devices for thereafter accessing the disk drives in accordance with the stripe control information to obtain a remaining portion of the requested data, said accessing of the disk drives being performed in accordance with the sequence of commands, and the next command indicator pointing to one of the commands in the sequence of commands where the next command following the initial command is obtained.

28. A computer readable medium as recited in claim 27, wherein subsequent next commands are obtained from the sequence of commands as those that sequentially follow the next command.

29. A computer readable medium as recited in claim 28, wherein the sequence of commands is a repetitive sequence of commands.

30. A computer readable medium as recited in claim 29, wherein the command within the sequence of commands include at least a skip command and a transfer command.

* * * * *